United States Patent [19]
Miller

[11] Patent Number: 5,006,588
[45] Date of Patent: Apr. 9, 1991

[54] CORROSION AND CRACK GROWTH INHIBITING COMPOUND, COATING, AND SEALANT MATERIAL AND METHOD OF MAKING

[75] Inventor: Robert N. Miller, Acworth, Ga.

[73] Assignee: Lockheed Corporation, Calabasas, Calif.

[21] Appl. No.: 373,550

[22] Filed: Jun. 30, 1989

Related U.S. Application Data
[62] Division of Ser. No. 230,128, Aug. 9, 1988, abandoned.

[51] Int. Cl.$^5$ .............................. C08K 3/10; C08K 3/34
[52] U.S. Cl. .................................... 524/406; 524/442; 252/387; 428/425.8; 428/457; 106/14.05
[58] Field of Search ................. 524/406, 442; 252/387; 428/425.8, 457; 106/14.05

[56] References Cited
U.S. PATENT DOCUMENTS
| | | | |
|---|---|---|---|
| 3,730,937 | 5/1973 | Boggs et al. | 524/407 |
| 4,243,417 | 1/1981 | Grourke et al. | 524/406 |
| 4,532,289 | 7/1985 | Mosser et al. | 524/406 |
| 4,680,334 | 7/1987 | Wallace | 524/406 |

OTHER PUBLICATIONS
Mellor, "A Comprehensive Treatise on Inorganic and Theoretical Chemistry," XI, (563).

*Primary Examiner*—Kriellion Morgan
*Attorney, Agent, or Firm*—Robert P. Barton

[57] ABSTRACT

A corrosion and crack growth inhibitor and method of making are disclosed, the inhibitor being relatively non-toxic as well as unreactive with elastomeric material so as to form a coating and sealing composition for application to metal surfaces.

6 Claims, 4 Drawing Sheets

CORROSION AND CRACK GROWTH INHIBITING COMPOUND, COATING, AND SEALANT MATERIAL AND METHOD OF MAKING

This is a divisional of co-pending application Ser. No. 0/230,108 filed on Aug. 9, 1988 now abandoned.

TECHNICAL FIELD

The present invention relates generally to corrosion and crack growth inhibiting coating and sealing materials for application to metal surfaces as well as a method of making, and more particularly to a relatively non-toxic corrosion and crack growth inhibitor and a procedure for adding such a non-toxic corrosion and crack growth inhibitor to curable elastomeric coating and sealant materials without adversely affecting the cure rate of the elastomeric material.

BACKGROUND OF THE INVENTION

Corrosion inhibitive coatings and sealants, such as disclosed by U.S. Pat. No. 3,730,937 to Boggs and Miller, utilize toxic chromates as the corrosion inhibitor compound. While the corrosion inhibitive, chromate containing polysulfide coatings and sealants proposed by Boggs and Miller prevent exfoliation corrosion of fastener holes as well as faying surface corrosion between adjacent exterior panels to thereby greatly extend the operational life of metallic structures, such as aircraft and the like; there is growing concern with difficulties encountered in the disposal of the toxic chromate containing waste associated with such corrosion inhibitive coatings and sealants.

In order to eliminate the waste disposal problems associated with chromate containing coating and sealant materials, less toxic inhibitor compounds have been investigated such as sodium nitrate, sodium molybdate and sodium metasilicate. However, in order to achieve the same level of corrosion inhibition that is provided by chromate containing coatings and sealants, approximately five times as much of the non-toxic inhibitor compound must be added to the sealant material. Moreover, when formulations containing these non-toxic inhibitor compounds are added to two part polysulfide sealants, the cure rate of the polysulfide sealant material is adversely effected resulting in either an unacceptable acceleration or retardation of the cure. While encapsulation of the inhibitor compounds has been proposed as a solution to the cure problem, it is both an expensive as well as time consuming process.

In addition to corrosion, metallic structures which are cyclically stressed, such as aircraft and the like, suffer from environmentally enhanced fatigue cracking. For example, the fatigue cracking of high strength aluminum in a salt water environment is more than double that experienced in a dry desert-like environment. Environmentally enhanced fatigue cracking is, essentially, a hydrogen embrittlement phenomenon and can be related to the corrosion process. When water reacts with a metal such as aluminum the corrosion products are aluminum hydroxide and hydrogen. In a fatigue cracking situation, the nascent atomic hydrogen migrates to the zones of maximum stress at the crack tip and, by its physical presence, decreases the force required to pull grains apart. Research has shown that the best corrosion inhibitors, such as the chromates, have little effect on the rate of fatigue cracking of metals such as aluminum alloys once a crack has initiated.

SUMMARY OF THE INVENTION

Accordingly, the present invention relates to a corrosion and crack growth inhibitor compound which is essentially non-toxic to the environment as well as unreactive with resilient, curable elastomeric materials so as to eliminate the detrimental effects of accelerating or decelerating the cure rate of the elastomeric material. The corrosion and crack growth inhibitor compound of this present invention is cerous molybdate. In another embodiment of the invention the crack growth inhibitor comprises the reaction product of cerous nitrate and sodium molybdate mixed in a stoichiometric ratio (0.86 parts by weight cerous nitrate to 1 part sodium molybdate) or with a slight excess of cerous nitrate (1 part cerous nitrate to 1 part sodium molybdate). A 1 to 1 ratio is advantageous in that the cerous nitrate is very soluble in water whereas the cerous molybdate is only slightly soluble. This provides a time release mechanism so that if water permeates the sealant it immediately dissolves some of the excess cerous nitrate but can only gradually deplete the reservoir of cerous ions provided by the cerous molybdate. The 1 to 1 ratio formulation is hereinafter referred to as L-21 inhibitor. In yet another embodiment the corrosion and crack growth inhibitor comprises the L-21 inhibitor mixed with sodium metasilicate in a concentration of about 5 parts L-21 to part sodium metasilicate, hereinafter referred to as the L-22 inhibitor.

The present invention also relates to a coating and sealant composition for application to metal surfaces which provides both corrosion as well as fatigue crack growth inhibition, particularly when applied to aluminum or aluminum alloy components. Additionally, the composition of the present invention minimizes galvanic interaction between aluminum and cadmium plated steel fasteners, a combination often found on modern day aircraft. The corrosion and crack growth inhibitor compounds employed by the composition of the present invention have relatively low toxicity and do not adversely affect the curing properties of the resilient, curable elastomeric material which forms a part of the coating and sealant composition of the present invention.

A principal feature of the present invention is the provision of a totally new approach to incorporating a reactive, corrosion and crack growth inhibitor compound to a resilient, curable elastomeric material without adversely affecting the cure rate of the elastomeric material, such function now accomplished in the art by means of encapsulation or the use of toxic chromate inhibitor compounds. In accordance with the present invention, the reactivity of non-toxic corrosion and crack growth inhibitor compounds, such as cerous nitrate and sodium molybdate, is reduced by reacting the compounds in an approximate stoichiometric ratio, or in a ratio of approximately 1 to 1 by weight to provide a slight excess of cerous nitrate, prior to placing the reaction product of these compounds in the curable elastomeric material. The reaction of the noted compounds is as follows:

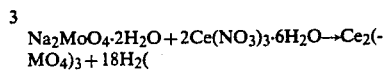

The reaction preferably is carried out in just enough distilled water to dissolve both the cerous nitrate and the sodium molybdate which, when combined produce a yellow precipitate. The distilled water is then evaporated to produce a mixture of cerous molybdate and sodium nitrate which forms one embodiment of the corrosion and crack growth inhibitor compound of the present invention.

Further in accordance with the present invention there is provided a coating and sealing composition for application to metal surfaces comprising the reaction product of cerous nitrate and sodium molybdate mixed in an approximate stoichiometric ratio or with a slight excess of cerous nitrate blended with a resilient, curable elastomeric material in a concentration of from approximately 1% to approximately 5% by weight.

Further in accordance with the present invention there is provided a coating and sealing composition for application to metal surfaces comprising the combination of the reaction product of cerous nitrate- and sodium molybdate mixed in an approximate stoichiometric ratio and sodium metasilicate in a ratio approximately 5 to 1 of reaction product to sodium metasilicate weight, the reaction product and sodium metasilicate being blended with a resilient, curable elastomeric material in a concentration of from approximately 1% to approximately 5% by weight.

In accordance with the present invention there is also provided a method of making a coating and sealing composition for application to metal surfaces comprising the steps of: dissolving both cerous nitrate and sodium molybdate in distilled water or other suitable solvents, reacting the dissolved cerous nitrate and sodium molybdate in an approximate stoichiometric ratio and blending the reaction product of cerous nitrate and sodium molybdate with a resilient, curable, elastomeric material to provide a concentration of the reaction product of from about 1% to about 5% by weight.

In accordance with the present invention, there is also provided a method of making a coating and sealing composition for application to metal surfaces comprising the steps of: dissolving cerous nitrate and sodium molybdate in a suitable solvent, reacting the dissolved cerous nitrate and sodium molybdate in an approximate stoichiometric ratio, adding sodium metasilicate in a ratio of about 20% by weight to the reaction product, and blending the reaction product and sodium metasilicate combination with a resilient, curable, elastomeric material to provide a concentration of the combination of reaction product and sodium metasilicate of from about 1% to about 5% by weight.

These and other important features and aspects of the present invention shall be apparent as the following description proceeds and with particular reference to the application drawings.

The Application Drawings

DETAILED DESCRIPTION OF THE PRESENT INVENTION

In the broadest sense, the present invention relates to a corrosion and crack growth inhibitor compound which is essentially non-toxic to the environment as well as unreactive with resilient, curable elastomeric materials so as not to affect the cure rate of the elastomeric material. The corrosion and crack growth inhibitor compound of the present invention comprises cerous molybdate which is made by reacting cerous nitrate and sodium molybdate in an approximate stoichiometric ratio or approximately 1 to 1 by weight so as to provide a slight excess of cerous nitrate. The reaction product of this combination provides both cerous molybdate and sodium nitrate as follows:

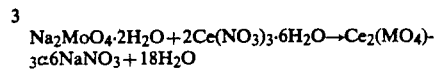

The reaction is carried out by dissolving the cerous nitrate and sodium molybdate in a suitable aqueous solvent, such as, for example, distilled water. Preferably, just enough solvent is used to dissolve the cerous nitrate and sodium molybdate. The compounds are then combined in an approximate stoichiometric ratio to produce a yellow precipitate which is the cerous molybdate. According to one embodiment of the present invention the cerous molybdate can be separated by a suitable means, such as by filtration, and used as a corrosion and crack growth inhibitor compound as well as a pigment for addition to paints and sealants.

According to another embodiment of the present invention, the reaction product of cerous nitrate and sodium molybdate is created as noted above, but instead of separating the yellow precipitate by filtration, the distilled water is evaporated from the reaction products to produce a mixture of cerous molybdate and sodium nitrate. The reaction product, which form another embodiment of the corrosion and crack growth inhibitor compound of the present invention, hereinafter referred to as the L-21 inhibitor, are then added to a resilient, curable elastomeric material such as, for example, a polysulfide polymer or polyurethane polymer as well as other types of two-part polymeric resin materials to form a coating and sealing composition. Preferably, the L-21 inhibitor is blended with the elastomeric material in a concentration of from about 1% to about 5% by weight.

In yet another embodiment of the present invention, a corrosion and crack growth inhibitor compound is formed by adding sodium metasilicate in a ratio of about 20% by weight to the L-21 inhibitor, the resulting inhibitor compound hereinafter being referred to as the L-22 inhibitor. Preferably, the L-22 inhibitor is blended with an resilient, curable elastomeric material, such as for the example a polysulfide polymer, in a concentration of from about 1% to about 5% by weight.

Figure 1:
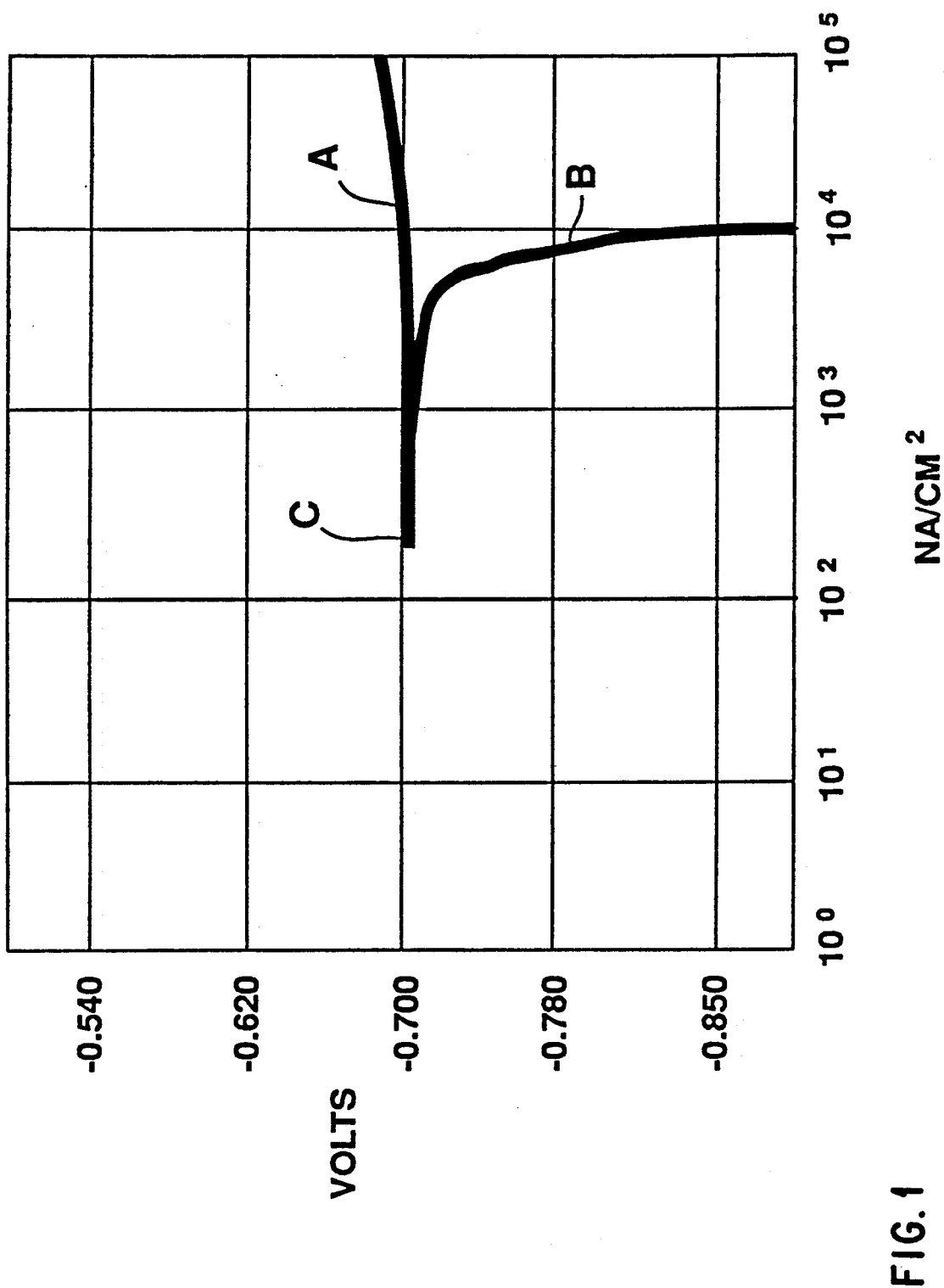
FIG. 1 is a potentiodynamic plot for untreated 7075-T6 aluminum in 3½% NaCl.

Referring to FIG. 1, a potentiodynamic plot for 7075-T6 aluminum in a solution of 3½% NaCl is shown. The ordinate axis referencing the impressed voltage in volts while the abscissa axis references the corrosion current in $na/cm^2$. Leg A of the plot representing the anodic lobe and leg B of the plot representing the cathodic lobe. Point C represents the rest potential and is important when the aluminum is coupled to another metal having a different galvanic potential. The sample shown in FIG. 1 experienced a corrosion rate of 3.35 mils/yr.

Figure 2:
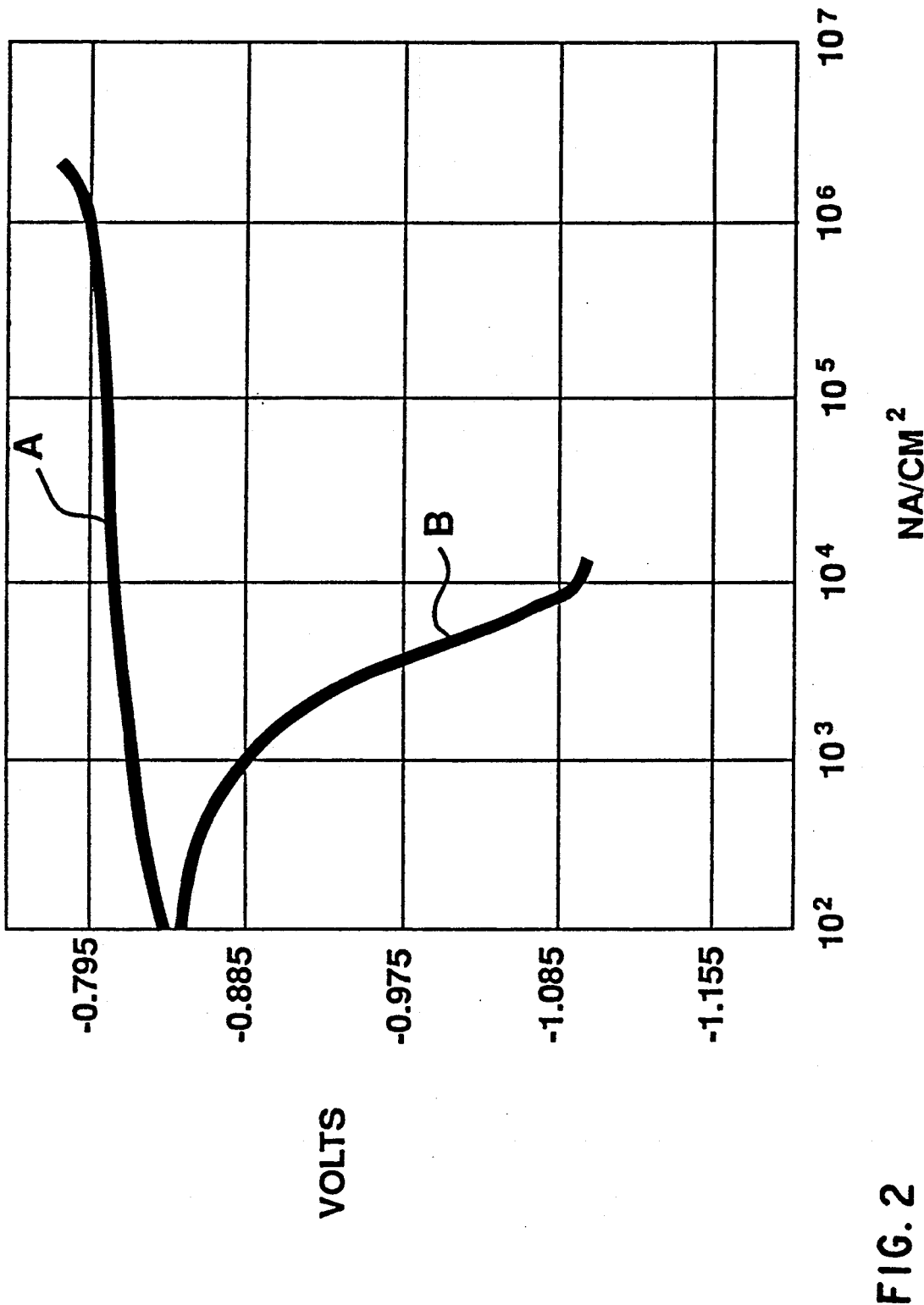
FIG. 2 is a potentiodynamic plot for 7075-T6 aluminum in 3½% NaCL and 0.05% $MgCrO_4$.

FIG. 2 represents a potentiodynamic plot for 7075-T6 aluminum immersed in a 3½% NaCl solution containing 0.05% $MgCrO_4$. Note the reduction in the corrosion current experienced by the cathodic lobe B of the plot, while the anodic lobe A remains essentially the same with reference to the impressed voltage.

Figure 3:
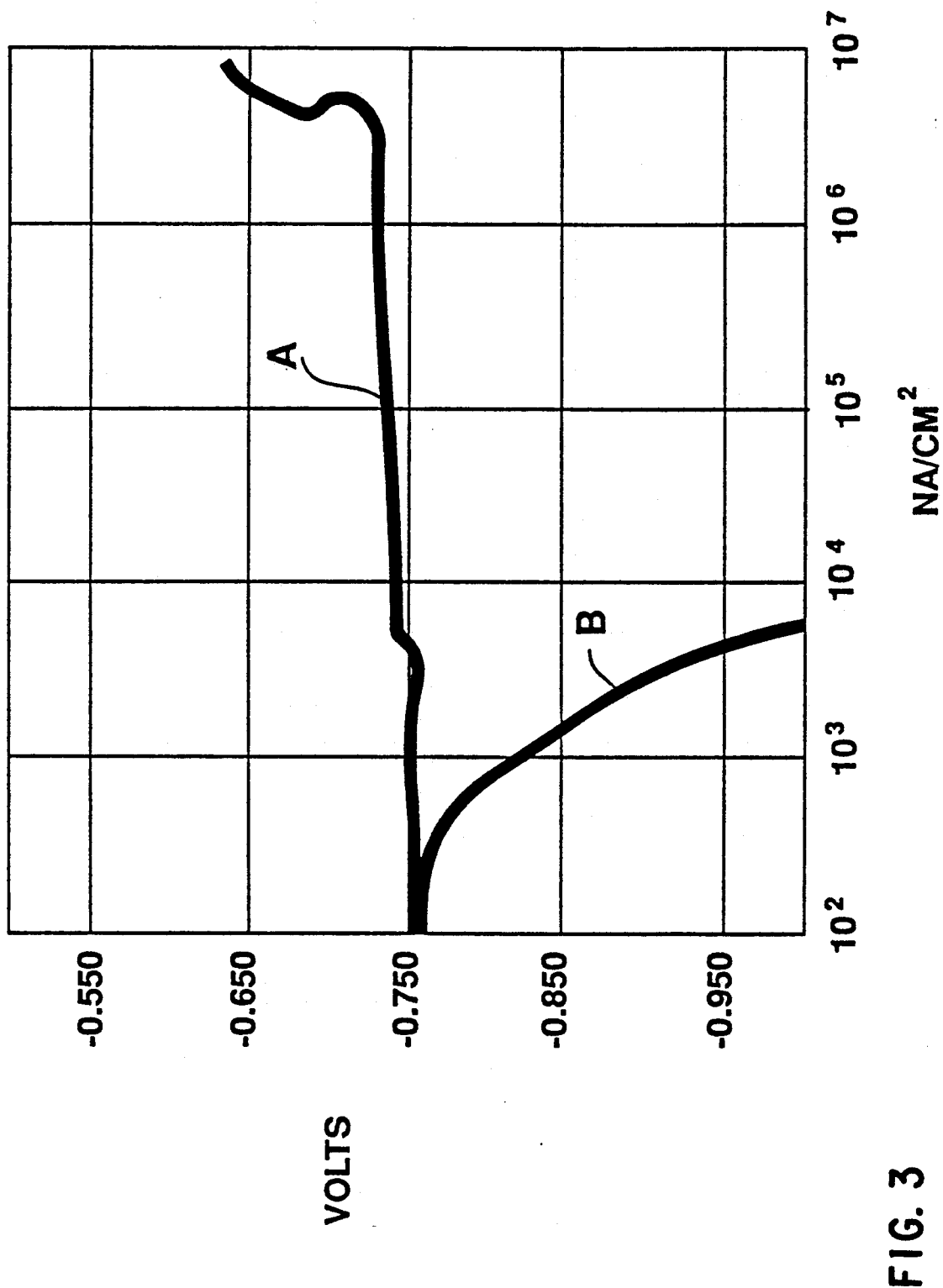
FIGS. 3 and 4 are potentiodynamic plots for 7075-T6 aluminum immersed in solutions of different embodiments of the composition of the present invention and in 3½% NaCl.

FIG. 3 is a potentiodynamic plot for 7075-T6 aluminum immersed in a solution of 0.033% by weight of the L-21 material and 3½% NaCl. Note the reduction in the corrosion current experience by the cathodic lobe B of the plot. The corrosion rate for this sample was found to be 0.21 mils/yr which compares favorably with a corrosion rate of 0.32 mils/yr experienced by the aluminum treated with a chromate containing inhibitor as shown by FIG. 2.

Figure 4:
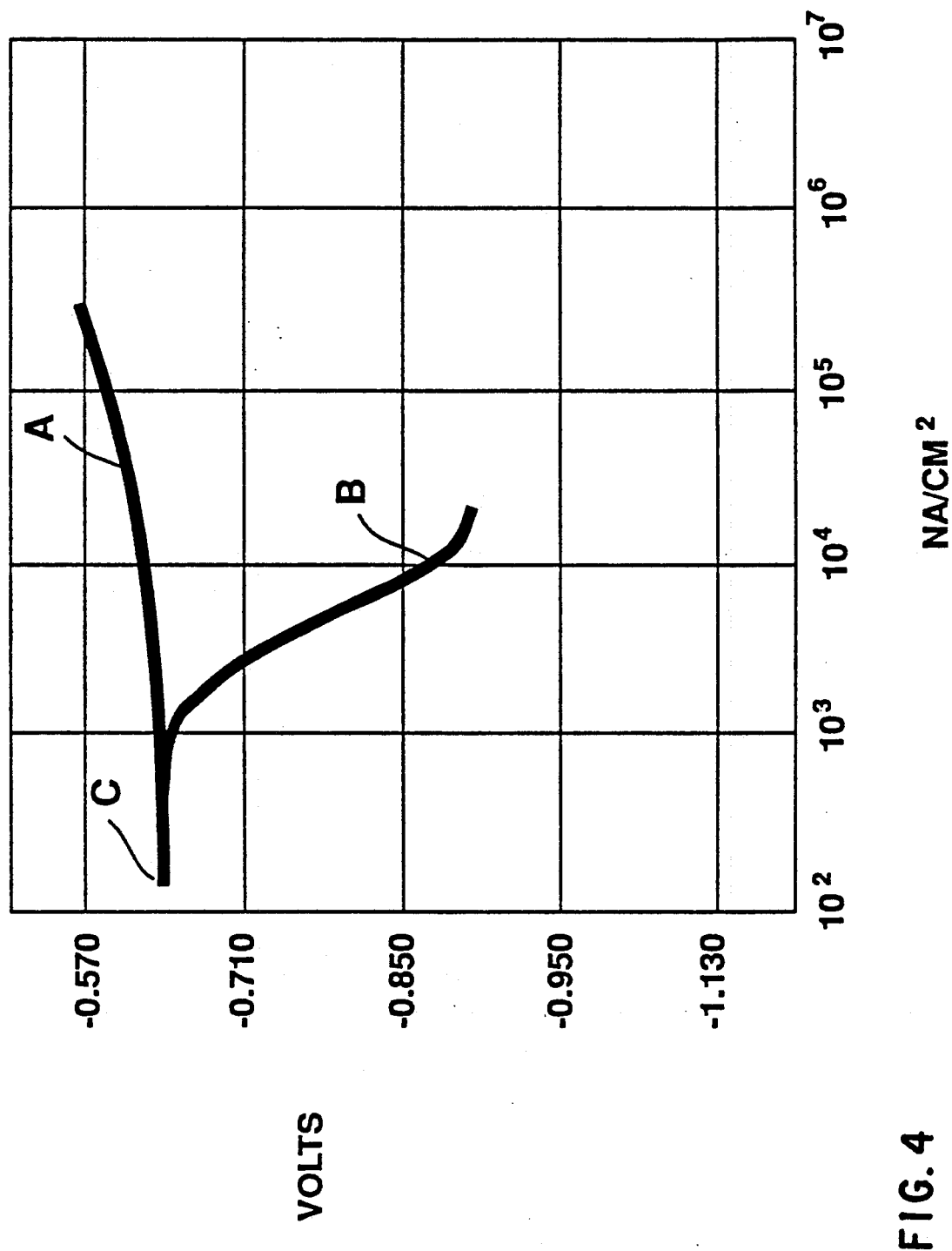

FIG. 4 is a potentiodynamic plot for 7075-T6 aluminum immersed in a solution of 1200 ppm of the L-22 material and 3½% solution of NaCl. Note the reduction in the cathodic lobe B of the plot. This sample experienced a corrosion rate of 0.43 mils/yr. Note that the rest potential C has moved up the scale so as to become more noble and therefore less reactive.

In addition to the foregoing test date, the following table represents the fatigue crack growth retardant quality of the L-22 inhibitor. Center-crack fatigue specimens of 7075-T6 aluminum, 4 inches wide, 0.1 inches thick and 16 inches long were cycled at 2Hz with a stress intensity of 6 KSI/sq. rt. in., at the crack tip.

TABLE I

| ENVIRONMENT | CRACK GROWTH/CYCLE (Inches × 10-E6) |
| --- | --- |
| Ambient (<50% R.H.) | 3.6 |
| Distilled Water | 4.8 |
| Distilled Water + 1200 ppm L-22 Inhibitor | 2.4 |
| Aqueous Extract of MIL-S-8802 Sealant containing 3% L-22 Inhibitor | 3.4 |

The results of the fatigue tests indicate that the L-22 inhibitor neutralizes the detrimental effects of moisture in the environment.

While the invention has been particularly shown and described with reference to preferred embodiments thereof, it will be understood by those skilled in the art that various alterations in form and detail will be made therein without departing from the spirit and scope of the invention.

I claim:

1. A corrosion and crack growth inhibiting coating and sealing composition for application to metal surfaces comprising cerous molybdate blended with a resilient, curable elastomeric polysulfide in a concentration of from about 1% to about 5% by weight.

2. A corrosion and crack growth inhibiting coating and sealing composition for application to metal surfaces comprising cerous molybdate blended with a resilient, curable elastomeric polyurethane in a concentration of from about 1% to about 5% by weight.

3. A corrosion and crack growth inhibiting coating and sealing composition for application to metal surfaces comprising the reaction product of cerous nitrate and sodium molybdate mixed in an approximate stoichiometric ratio blended with a resilient, curable elastomeric polysulfide in a concentration of about 1% to about 5% by weight.

4. A corrosion and crack growth inhibiting coating and sealing composition for application to metal surfaces comprising the reaction product of cerous nitrate and sodium molybdate mixed in an approximate stoichiometric ratio blended with a resilient, curable elastomeric polyurethane in a concentration of about 1% to about 5% by weight.

5. A corrosion and crack growth inhibiting coating and sealing composition for application to metal surfaces comprising the reaction product of cerous nitrate and sodium molybdate mixed in an approximate stoichiometric ratio blended with a resilient, curable elastomeric polysulfide in a concentration of about 1% to about 5% by weight, and sodium metasilicate mixed with said reaction product in a concentration of about 20% by weight of said sodium metasilicate to said reaction product.

6. A corrosion and crack growth inhibiting coating and sealing composition for application to metal surfaces comprising the reaction product of cerous nitrate and sodium molybdate mixed in an approximate stoichiometric ratio blended with a resilient, curable elastomeric polyurethane in a concentration of about 1% to about 5% by weight, and sodium metasilicate mixed with said reaction product in a concentration of about 20% by weight of said sodium metasilicate to said reaction product.

* * * * *